G. GORTON.
DISH WASHING MACHINE.
APPLICATION FILED JAN. 2, 1914.
1,159,661.
Patented Nov. 9, 1915.
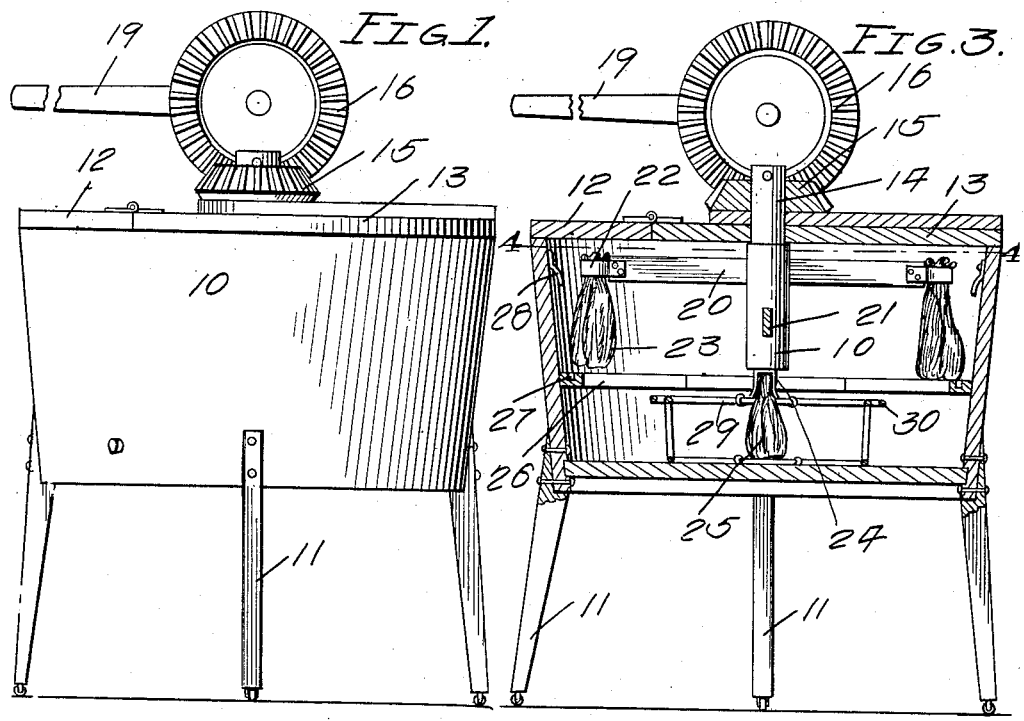
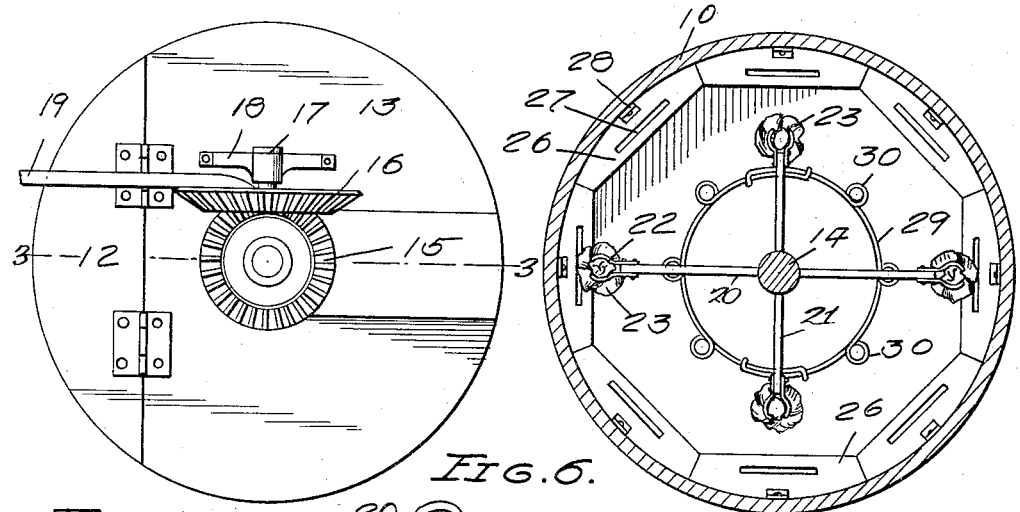
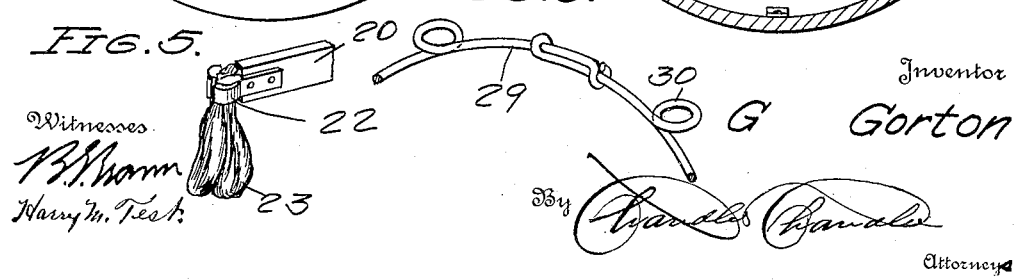
Inventor
G Gorton

UNITED STATES PATENT OFFICE.

GEORGIA GORTON, OF BAY VIEW, WASHINGTON.

DISH-WASHING MACHINE.

1,159,661.  Specification of Letters Patent.  Patented Nov. 9, 1915.

Application filed January 2, 1914. Serial No. 809,963.

*To all whom it may concern:*

Be it known that I, GEORGIA GORTON, a citizen of the United States, residing at Bay View, in the county of Skagit, State of Washington, have invented certain new and useful Improvements in Dish-Washing Machines; and I do hereby declare the following to be a full, clear, and exact description of the invention, such as will enable others skilled in the art to which it appertains to make and use the same.

This invention relates to improvements in washing machines and particularly to machines for washing dishes.

The principal object of the invention is to provide a simple and novel device of this character by means of which shallow dishes or saucers as well as deep dishes or bowls can be washed at the same time.

Another object of the invention is the provision of novel means for holding dish cloths so that all parts of the faces of the dishes which are presented thereto will be thoroughly cleaned.

Another object is the provision of novel means for holding the dishes while being washed.

Other objects and advantages will be apparent from the following description, when taken in connection with the accompanying drawing.

In the drawing: Figure 1 is an elevation of my dish washing machine. Fig. 2 is a top plan view. Fig. 3 is a vertical transverse sectional view on the line 3—3 of Fig. 2. Fig. 4 is a horizontal sectional view on the line 4—4 Fig. 3. Fig. 5 is a fragmentary perspective view showing one of the means for holding a dish cloth. Fig. 6 is a perspective view of a portion of the rack or receptacle 29.

Referring particularly to the accompanying drawing, 10 represents a suitable tub supported on the legs 11. The tub is provided with a stationary cover portion 12 and a hinged lid portion 13. Disposed centrally through the lid portion is a shaft 14, the upper end of which carries a bevel pinion 15 which meshes with a vertically disposed beveled pinion 16 mounted on a stub shaft 17, said shaft being rotatably mounted in a vertical bracket bearing 18 carried by the lid. Secured to the pinion 16 is a handle lever 19 which is adapted to be rocked back and forth so as to impart partial rotation to the shaft 14 back and forth. The shaft 14 extends into the tub and carries radially extending arms 20 and 21, the outer end of each of the arms carrying a pair of spring clips 22 which hold the dish washing cloths 23. The lower end of the shaft 14 has a downwardly extending spring clip 24 which grips a cloth 25, this cloth being disposed centrally adjacent the bottom of the tub.

Mounted in the tub, and secured to the side wall thereof is a surrounding shelf 26, this shelf being formed at spaced intervals with elongated recesses 27. Pivotally mounted above each of the recesses, on the side wall of the tub is a gripping finger 28, this finger being at a proper height to engage over the upper edge of a plate or saucer which has its lower edge portion seated within one of the recesses 27. Disposed within the tub, and centrally on the bottom thereof is an expansible open-work receptacle 29 within which is adapted to be placed a deep dish or bowl in which the cloth 25 will be disposed.

In the operation of the device a plurality of plates and saucers are disposed in the recesses 27 and secured in place by the fingers 28. A deep dish or bowl is placed in the receptacle 29 and the dish cloth 25 disposed therein. The handle 19 is then rocked back and forth, causing the arms 20 and 21 to swing and by centrifugal force the cloths 23 swing outwardly and wipe across the faces of the plates and saucers. At the same time the cloth 25 will rotate within the bowl or dish in the center of the tub and thoroughly cleanse the interior thereof. The receptacle 29 is provided with a plurality of loops 13 in which are adapted to be placed knives, forks and spoons. These loops are so disposed that the cloths on the arms 21 will engage the knives, forks and spoons at the same time the other cloths engage the bowl and plates and saucers.

What is claimed, is:—

The combination with a tub having table ware supporting means therein, of a depending shaft within the tub, radial arms disposed in different planes, cloth holding clips at the ends of the arms, and a cloth holding clip on the lower end of the shaft.

In testimony whereof, I affix my signature, in the presence of two witnesses.

MRS. GEORGIA GORTON.

Witnesses:
  IDA M. WAITE,
  WALTER I. GORTON.

Copies of this patent may be obtained for five cents each, by addressing the "Commissioner of Patents, Washington, D. C."